US012624895B2

(12) United States Patent
Tamura et al.

(10) Patent No.: US 12,624,895 B2
(45) Date of Patent: May 12, 2026

(54) DRYING FURNACE WITH FIRST AND SECOND HOT AIR SUPPLY PORTS

(71) Applicant: TRINITY INDUSTRIAL CORPORATION, Aichi (JP)

(72) Inventors: Satoshi Tamura, Aichi (JP); Shigeki Fujiwara, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 852 days.

(21) Appl. No.: 17/797,244

(22) PCT Filed: Feb. 5, 2021

(86) PCT No.: PCT/JP2021/004217
§ 371 (c)(1),
(2) Date: Aug. 3, 2022

(87) PCT Pub. No.: WO2021/161906
PCT Pub. Date: Aug. 19, 2021

(65) Prior Publication Data

US 2023/0058673 A1 Feb. 23, 2023

(30) Foreign Application Priority Data

Feb. 10, 2020 (JP) ................................ 2020-020308

(51) Int. Cl.
*F26B 21/50* (2026.01)
*F26B 3/04* (2006.01)
(Continued)

(52) U.S. Cl.
CPC ................ *F26B 21/50* (2026.01); *F26B 3/04* (2013.01); *F26B 15/16* (2013.01); *F26B 15/18* (2013.01); *F26B 2210/12* (2013.01)

(58) Field of Classification Search
CPC .. F26B 21/04; F26B 3/04; F26B 15/16; F26B 15/18; F26B 2210/12
(Continued)

(56) References Cited

U.S. PATENT DOCUMENTS 2,745,190 A * 5/1956 Moule .................... F26B 15/12 34/223
4,546,553 A * 10/1985 Best ....................... F26B 21/00 427/372.2
(Continued)

FOREIGN PATENT DOCUMENTS

DE 102011053634 B3 * 3/2013 ............... C21D 1/76
EP 0268691 6/1988
(Continued)

*Primary Examiner* — Stephen M Gravini
(74) *Attorney, Agent, or Firm* — Millen, White, Zelano & Branigan, P.C.; Christopher W. Brody

(57) ABSTRACT

A drying furnace comprises a plurality of drying areas that are continuously provided along a longitudinal direction of the furnace and include a first hot air supply port, a second hot air supply port, and an exhaust port. The first hot air supply port is arranged at a position below a vehicle body in the furnace shell to discharge hot air diagonally upward. The second hot air supply port is arranged at a position higher than the first hot air supply port in the furnace shell to discharge hot air diagonally downward. The exhaust port is arranged at a position lower than the first hot air supply port and the second hot air supply port in the furnace shell to discharge the hot air outside the furnace shell. The drying furnace uniformly raises the temperature of the external and internal parts of the vehicle body while shortening the furnace length.

8 Claims, 8 Drawing Sheets

(51) Int. Cl.
*F26B 15/16* (2006.01)
*F26B 15/18* (2006.01)

(58) Field of Classification Search
USPC ..................................................... 34/666
See application file for complete search history.

(56) References Cited

U.S. PATENT DOCUMENTS 4,569,658 A * 2/1986 Wiggins ................. A21B 1/245 99/473
4,656,758 A * 4/1987 Nakayama ............. F26B 15/12 34/212
5,657,555 A * 8/1997 Milojevic ............... F26B 21/02 34/271
7,658,017 B1 * 2/2010 Laviolette ............... F26B 5/042 34/403
8,910,396 B1 * 12/2014 Burchell ............... F26B 21/004 431/328
9,194,034 B2 * 11/2015 Steins ..................... C22C 38/32
10,584,920 B2 * 3/2020 Iglauer ...................... F26B 3/04
11,047,624 B2 * 6/2021 Sakita ................... F26B 25/008
11,486,641 B2 * 11/2022 Gümbel .................. F25B 21/02
2017/0314853 A1 * 11/2017 Natsume ................... F26B 3/04
2017/0349151 A1 12/2017 Seibold et al.
2023/0058673 A1 * 2/2023 Tamura ................... F26B 15/16

FOREIGN PATENT DOCUMENTS

EP 3261886 B1 * 4/2019 .............. B60S 3/002
JP 2005-138037 6/2005
JP 2007-222821 9/2007
JP 2008-232517 10/2008
JP 2021124274 A * 8/2021 .............. F26B 15/12
WO WO-2016134768 A1 * 9/2016 .............. B60S 3/002
WO 2018/173351 9/2018
WO WO-2021161906 A1 * 8/2021 .............. F26B 15/12

* cited by examiner

Temperature rising time depending on the ratio of air volume supplied

DRYING FURNACE WITH FIRST AND SECOND HOT AIR SUPPLY PORTS

TECHNICAL FIELD

The present invention relates to a drying furnace and a coating drying method, more specifically relates to a drying furnace and a coating drying method in which plural drying areas are continuously provided along the longitudinal direction of the furnace.

TECHNICAL BACKGROUND

Typically, in an automobile coating line, an electrodeposition drying furnace, a sealer drying furnace, or a coating drying furnace is installed along a conveyor line that conveys an automobile body which is an object to be dried. This type of drying furnace is formed in a tunnel shape in which an entrance and an exit are provided at both ends of the furnace body for drying and curing a coating film of an automobile body while being conveyed by a conveyor in the tunnel. Generally, in the drying furnace, a plurality of drying areas is continuously provided along the longitudinal direction of the furnace. These drying areas are specifically provided with a temperature rising zone in which the wet coating film of the automobile body is quickly dried, then heated up to the preset temperature, and a temperature holding zone in which the automobile body is heated and maintained at the preset temperature. FIGS. 6 and 7 show an example of a conventional drying furnace 111.

The conventional drying furnace 111 shown in FIGS. 6 and 7 has a temperature rising zone 15 that includes the first three drying areas A1, A2, and A3, and a temperature holding zone 16 that includes the last drying area A4. A hot air supply port 41 and an exhaust port 43 are both provided in each of the drying areas A1 to A4. The hot air supply port 41 is arranged at a position lower than the automobile body W1 in a furnace shell 17, and hot air is supplied from a blowout duct 23 to the hot air supply port 41. The exhaust port 43 is arranged at a position higher than the automobile body W1 in the furnace shell 17, and hot air is discharged from the exhaust port 43 to a suction duct 24. Also, the drying furnace 111 of a similar structure to this is disclosed in the following documents (see, e.g., Patent Document 1).

PRIOR ARTS

Patent Document

Patent Document 1: Japanese Published Unexamined Patent Application No. 2005-138037 (See FIG. 1)

DISCLOSURE OF THE INVENTION

Problems to be Solved by the Invention

Incidentally, the time required to reach the temperature at which the coating film of the automobile body is cured is called "heating-up time". Since the conveyance speed of the automobile body is usually constant, if the heating-up time is required to be longer, then it is necessary to make the furnace length longer. In other words, the length of the drying furnace is determined by the length of the heating-up time.

In addition, the heating-up time also differs depending on the part of the automobile body. For example, comparing the external parts, which are mainly the outer plate, with the internal parts, which are primarily the inner plate, the heating-up time of the internal parts that are not easily hit by the direct hot air is inevitably more extended than that of the external parts that are easily hit by the direct hot air. Regarding the graph of FIG. 8, the horizontal axis represents time, and the vertical axis represents the body temperature. The temperature transition of the external parts is shown by a solid line, and the temperature transition of the internal parts is shown by a broken line. The drying furnace 111 is also correspondingly shown on the upper side of the graph. The graph shows that the external parts reach the preset temperature of about 160° C. relatively quickly (i.e., within 20 minutes), while the internal parts take 30 minutes or more, which means there is a difference in the heat-up time between them. For this reason, according to the conventional drying furnace, it is necessary to prioritize the heating conditions of the internal parts to secure a sufficient heating-up time. As a result, there is a drawback that the drying furnace length needs to be longer. Further, in such a case, while the furnace length is longer, the initial cost of equipment and running cost become also higher. Thus, it is required to shorten the furnace length.

The present invention has been achieved in light of the above problems, and its object is to provide a drying furnace and a coating drying method that allows for raising the temperature of external parts and internal parts of a vehicle body efficiently and uniformly, thus making it possible to shorten the furnace length.

Means for Solving the Above Problems

To solve the above problems, the first aspect of the present invention refers to a drying furnace in which a plurality of drying areas is continuously provided along the longitudinal direction of the furnace, to blow hot air to an automobile body while being conveyed in the longitudinal direction within the furnace shell, and then to dry a coating film applied to the automobile body, characterized in that the plurality of drying areas comprises; a first hot air supply port arranged at a position below the automobile body in the furnace shell to discharge hot air diagonally upward; a second hot air supply port arranged at a position higher than the first hot air supply port in the furnace shell to discharge hot air diagonally downward; and an exhaust port arranged at a position lower than the first hot air supply port and the second hot air supply port in the furnace shell to discharge hot air to the outside of the furnace shell.

According to the first aspect of the present invention as described above, when discharging hot air diagonally upward from the first hot air supply port arranged at a position below the vehicle body, the hot air mainly hits the external parts, thus efficiently heating the coating film of the external parts.

Also, the hot air is discharged diagonally downward from the second hot air supply port arranged at a position higher than the first hot air supply port. Besides, the hot air is discharged from the exhaust port arranged at a position lower than the first hot air supply port and the second hot air supply port, so that the hot air is easily introduced into a room through a window of the vehicle body. As such, the hot air from the second hot air supply port mainly hits the internal parts, thus efficiently heating the coating film of the internal parts. Then, the heating-up time of the external parts and the internal parts of the vehicle body is shortened, and the difference in the heating-up time is eventually reduced. As a result, the temperature of the external and internal parts of the vehicle body can be raised efficiently and uniformly, thus making it possible to shorten the furnace length.

The second aspect of the present invention refers to a drying furnace, according to the first aspect of the present invention, characterized in that the first hot air supply port is arranged at the position of a floor-back level of the vehicle body, and the second hot air supply port is arranged at a window level position of the vehicle body.

According to the second aspect of the present invention as described above, when discharging the hot air diagonally upward from the first hot air supply port arranged at the said position, the coating film of mainly external parts including the outer floor side of the vehicle body is efficiently heated, then the temperature rises. Further, when discharging the hot air diagonally downward from the second hot air supply port arranged at the said position, the hot air can be introduced into the room through the window of the vehicle body. Therefore, the coating film of mainly the internal parts including the inner floor of the vehicle body is efficiently heated, then the temperature rises.

The third aspect of the present invention refers to a drying furnace according to the first or second aspect of the present invention, characterized in that the first hot air supply port and the second hot air supply port are both configured to include a nozzle, wherein the first nozzle constituting the first hot air supply port is more excellent than the second nozzle constituting the second hot air supply port in terms of attracting action to entrain the surrounding air in the furnace shell.

According to the third aspect of the present invention, the nozzle constituting the first hot air supply port entrains the surrounding air in the furnace shell and discharges the hot air, thus making it possible to apply a large amount of hot air to the outer floor side of the vehicle body. Therefore, the coating film of mainly the external parts including the outer floor side of the vehicle body is heated more efficiently, then the temperature rises in a shorter time.

The fourth aspect of the present invention refers to a drying furnace according to any one of the first to third aspects of the present invention, characterized in that the first hot air supply port and the second hot air supply port are both configured to include a nozzle, wherein the second nozzle constituting the second hot air supply port is more excellent than the first nozzle constituting the first hot air supply port in terms of the action of allowing the hot air to advance straightly.

According to the fourth aspect of the present invention, the second nozzle constituting the second hot air supply port discharges the hot air and lets it advance straightly, thus making it possible to reliably introduce the hot air into the room through the window of the vehicle body. At the same time, the hot air reaches the inner floor side of the vehicle body located at a relatively far position, then heats it. Therefore, the coating film of mainly the internal parts including the inner floor of the vehicle body is heated more efficiently, then the temperature rises in a shorter time.

The fifth aspect of the present invention refers to a drying furnace according to any one of the first to fourth aspects of the present invention characterized in that, the distance between the inner surface of the furnace shell and the vehicle body is set to be 300 mm or less.

According to the fifth aspect of the present invention, a surplus space in the furnace can be eliminated, thus making it possible to downsize the whole furnace. Also, regarding the second nozzle constituting the second hot air supply port, at least half of the total length should preferably be embedded in the furnace shell. With such a configuration, the protrusion of the second nozzle from the furnace shell can be reduced without impairing the straight-advancing action of the hot air from the second nozzle constituting the second hot air supply port. Therefore, the section where the second hot air supply port is formed in the furnace shell can also be brought close to the vehicle body, thus making it possible to heat the vehicle body more efficiently, then the temperature rises in a shorter time.

Furthermore, the sixth aspect of the present invention refers to a method for drying a coating film applied to an automobile body by blowing the hot air while the vehicle body is being conveyed in the longitudinal direction in the furnace shell of the drying furnace where a plurality of the drying areas is provided along the longitudinal direction, characterized in that, each of the drying areas comprises: a means by which the hot air is discharged diagonally upward from the first hot air supply port arranged at a position below the vehicle body in the furnace shell, so as to dry the coating film of mainly the external parts including the outer floor side of the vehicle body; another means by which the hot air is discharged diagonally downward from the second hot air supply port arranged at a position higher than the first hot air supply port in the furnace shell, wherein such hot air is introduced into a room through a window of the vehicle body, so as to dry the coating film of mainly the internal parts including inner floor portion of the vehicle body; and yet another means by which the hot air is discharged to the outside of the furnace shell through an exhaust port arranged at a position lower than the first hot air supply port and the second hot air supply port in the furnace shell.

According to the sixth aspect of the present invention, when discharging the hot air diagonally upward from the first hot air supply port arranged at a position below the vehicle body, the hot air mainly hits the external parts so that the coating film of the external parts is efficiently heated. Further, hot air is discharged diagonally downward from the second hot air supply port arranged at a position higher than the first hot air supply port. In addition, hot air is discharged from the exhaust port arranged at a position lower than the first hot air supply port and the second hot air supply port, thus making it easier to introduce the hot air into the room through the window of the vehicle body. As a result, the hot air from the second hot air supply port mainly hits the internal parts so that the coating film of the internal parts is efficiently heated. Therefore, the heating-up time of the external parts and the internal parts is shortened, and the difference in the heating-up time between them is also shortened. As a result, the temperature of the external parts and the internal parts can be efficiently and uniformly raised, thus making it possible to shorten the furnace length.

Effectiveness of the Invention

As described in detail above, according to the first to sixth aspects of the present invention, it is possible to efficiently and uniformly raise the temperature of the external parts and the internal parts of the vehicle body, thus making it possible to provide a drying furnace and a coating drying method that can shorten the length of the furnace.

MODES FOR CARRYING OUT THE INVENTION

Hereinafter, the coating drying furnace 11 as an embodiment of the present invention and the coating drying method using the same will be described in detail with reference to FIGS. 1 to 5.

Figure 1:
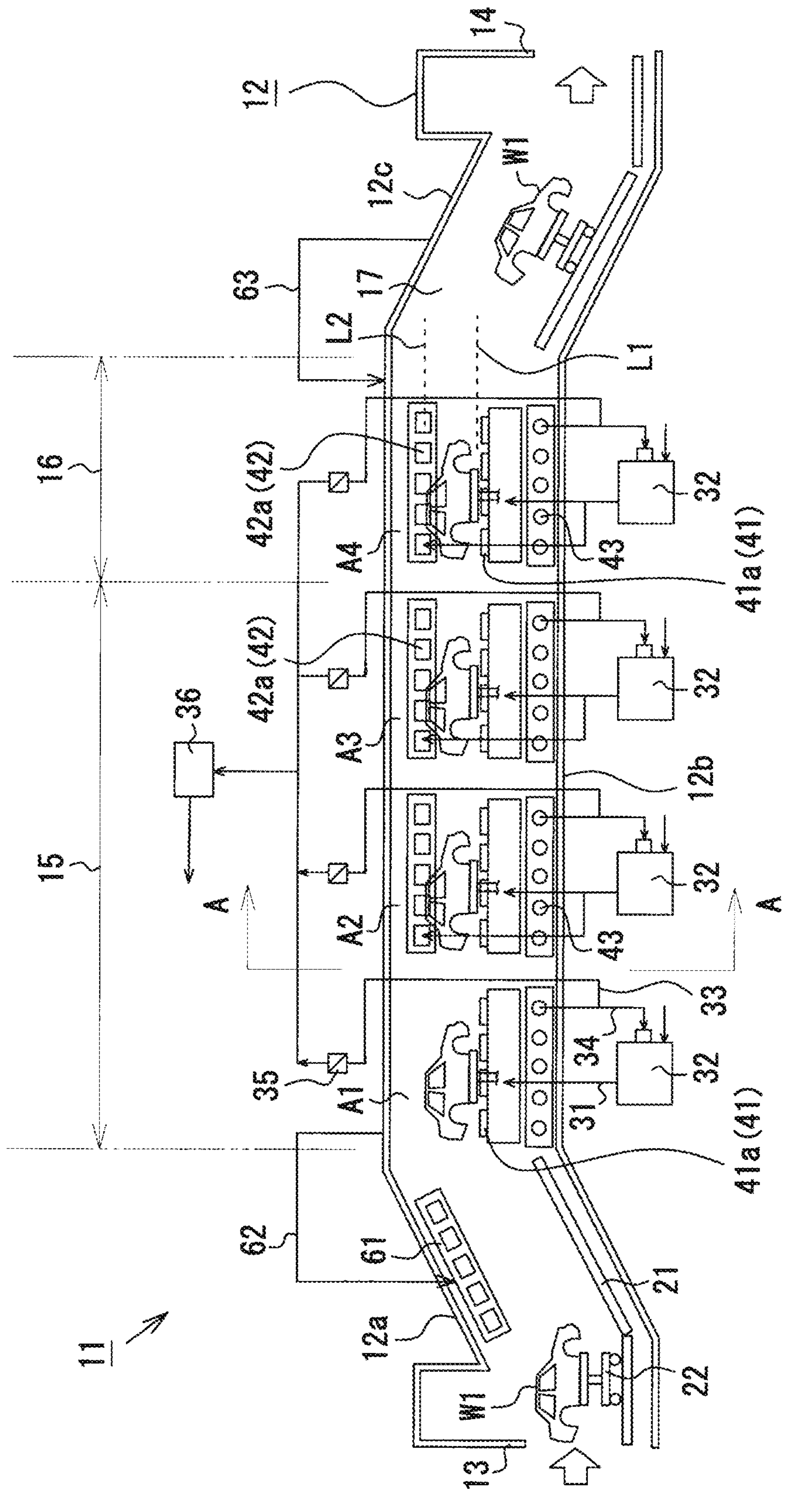
FIG. 1 is a schematic vertical sectional view showing the drying furnace as an embodiment of the present invention.
Figure 2:
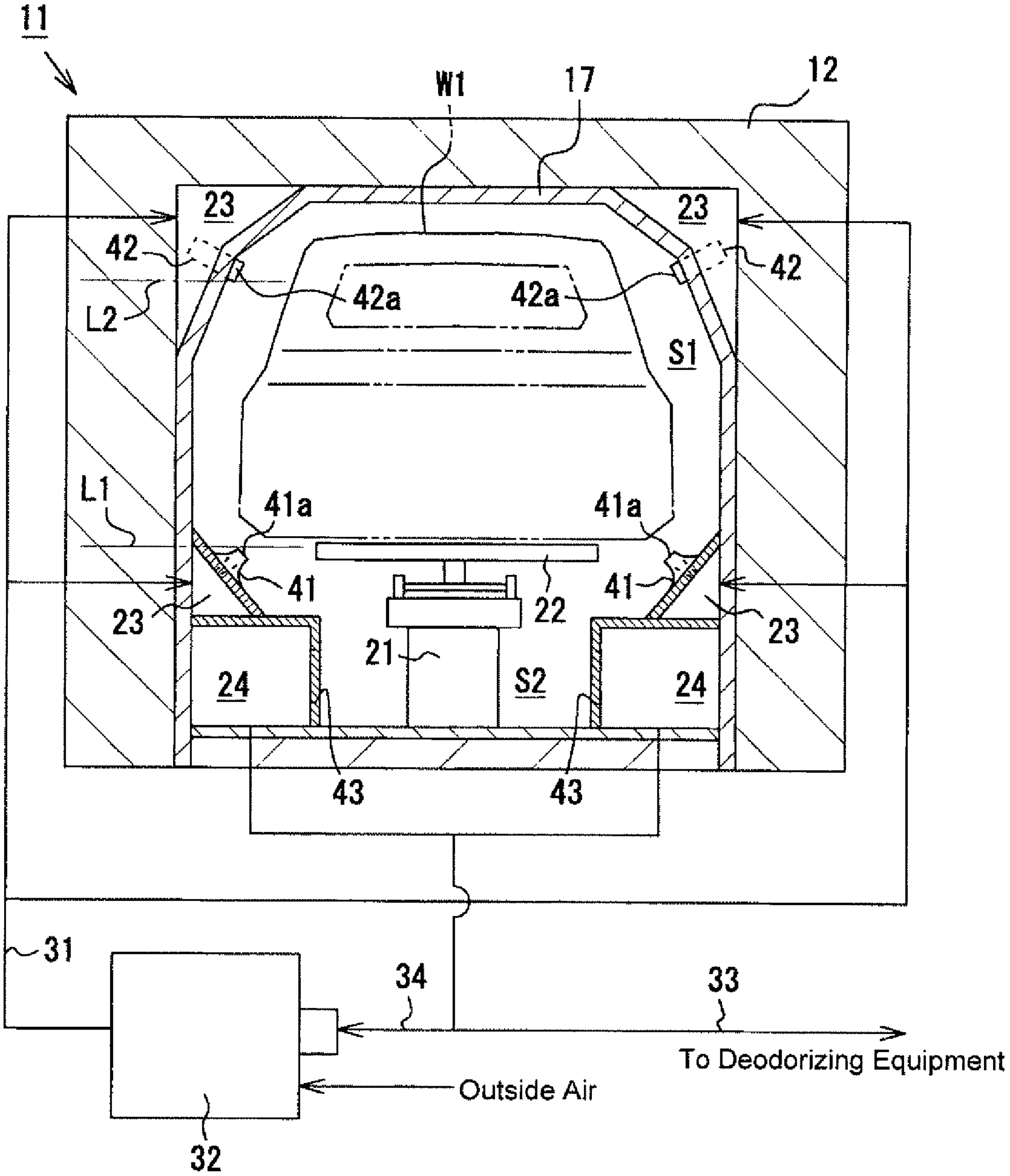
FIG. 2 is a schematic cross-sectional view taken along line A-A of FIG. 1.

As shown in FIGS. 1 and 2, the drying furnace 11 of the present embodiment has a so-called mound-shaped coating drying furnace to be installed in a coating line for drying the coating film of an automobile body W1 which is an object to be dried by the hot air. The coating film is not particularly limited but may be an arbitrary film. However, the present embodiment is embodied as an electrodeposition coating film formed by electrodeposition. Therefore, the drying furnace 11 of the present embodiment is a so-called electrodeposition drying furnace.

The furnace body 12 constituting the drying furnace 11 has a rectangular cross-section and a tunnel shape, and an ascending entrance passage 12*a*, a horizontal conveying passage 12*b*, and a descending exit passage 12*c* are arranged along the longitudinal direction of the furnace. An entrance 13 and an exit 14 are provided at both ends of the furnace body 12. That is, a height difference is provided along the longitudinal direction of the drying furnace 11, such that the positions of the entrance 13 and the exit 14 arranged at both ends of the furnace are lower than that of the horizontal conveying passage 12*b* arranged in the center of the furnace. Then, the automobile body W1 is carried into furnace body 12 from the entrance 13 and is carried out of the exit 14.

A temperature rising zone 15 is arranged at the first part of the horizontal conveying passage 12*b* in the furnace body 12 to heat automobile body W1 carried from the entrance 13 by the hot air until the temperature rises up to about 160° C. A temperature holding zone 16 is arranged in the last part of the horizontal conveying passage 12*b* to dry the automobile body W1 by the hot air while keeping the temperature of the automobile body W1 which has been heated in the conveyance through the temperature rising zone 15. The temperature rising zone 15 is composed of two or more drying areas, and the temperature holding zone 16 is composed of one or more drying areas. Specifically, according to the present embodiment, the temperature rising zone 15 is composed of three drying areas A1, A2, and A3, and the temperature holding zone 16 is composed of one drying area A4.

As shown in FIG. 2, a furnace shell 17 is provided inside the furnace body 12 constituting the drying furnace 11 so as to partition a space for the automobile body W1 to be conveyed therein. The upper middle region in the furnace shell 17 is a main space S1 for the automobile body W1 to be conveyed. The lower region in the furnace shell 17 is a subspace S2 in which a conveyance means (conveyor 21, carriage 22, etc.) for conveying the automobile body W1 is arranged. The subspace S2 is slightly narrower than the main space S1. The main space S1 in the furnace shell 17 of the present embodiment is formed into a cross-sectional shape that is close to the outer shape of the automobile body W1 which is the object to be dried when viewed from a forward/backward direction. Also, the distance between the inner wall surface of the furnace shell 17 and the outer surface of the automobile body W1 is relatively short, and it is designed to be, for example, about 250 mm to 300 mm in the present embodiment.

As shown in FIG. 2, a blowout duct 23 and a suction duct 24 are provided respectively at predetermined portions on the outside of the furnace shell 17 of the furnace body 12. An air supply passage 31 for supplying hot air into the furnace is connected to the blowout duct 23. A combustion unit 32 for generating hot air at a predetermined temperature by taking in outside air and heating it with a burner is connected to the air supply passage 31. An exhaust passage 33 for discharging hot air to the outside of the furnace is connected to the suction duct 24. A circulation passage 34 branches from the middle of the exhaust passage 33 and a part of the hot air is returned to the combustion unit 32 through the circulation passage 34 and such hot air is heated again. A fan 35 and a deodorizing equipment 36 are arranged at positions ahead of the branch portion of the circulation passage 34 in the exhaust passage 33. The fan 35 is for introducing hot air (contaminated air) exhausted through the exhaust passage 33 into the deodorizing equipment 36. Therefore, the hot air (contaminated air) in the exhaust passage 33 is deodorized and detoxified while passing through the deodorizing equipment 36, and then it is exhausted to the outside.

Next, the arrangement relationship among the first hot air supply port 41, the second hot air supply port 42, and the exhaust port 43 in the drying furnace 11 of the present embodiment will be described.

As shown in FIGS. 1 and 2, in the plurality of drying areas A1 to A4, a pair of right and left outlet ducts 23 for the first hot air supply ports are provided at the position below the automobile body W1 on the outside of the furnace shell 17. A plurality of first hot air supply ports 41 is arranged in the blowout duct 23 along the longitudinal direction of the furnace. A first nozzle 41*a* is attached to each of the plurality of first hot air supply ports 41. Specifically, these first nozzles 41*a* are arranged such that the hot air is discharged diagonally upward at the position of the floor back level L1 of the automobile body W1. Here, the first nozzle 41*a* constituting the first hot air supply port 41 preferably has a horn shape in which the inner side surface expands toward the front and has a structure in which an opening width in the second direction is 2 to 2.5 times greater than that in the first direction (see the technical disclosure of JP-A-2018-155463). The first nozzle 41*a* having such a structure is excellent in an attracting action to entrain the surrounding air in the furnace shell 17. Therefore, a large amount of hot air can be blown to the automobile body W1 even at a gentle wind speed.

Further, as shown in FIGS. 1 and 2, in the plurality of drying areas A2 to A4, a pair of right and left blowout duct 23 for the second hot air supply port are provided at a position higher than the first hot air supply port 41 on the outside of the furnace shell 17. A plurality of second hot air supply ports 42 is arranged along the longitudinal direction of the furnace in the blowout duct 23. A second nozzle 42*a* is attached to each of the plurality of second hot air supply ports 42. Specifically, these second nozzles 42*a* are arranged such that hot air is discharged diagonally downward at the position of the window level L2 of the automobile body W1. Here, the second nozzle 42*a* constituting the second hot air supply port 42 has an excellent action of advancing the hot air straightly and has a structure in which the length of more than half of the total length is buried in the furnace shell 17 (i.e., a region outside the furnace shell 17). Further, the distance between the portion where the second hot air supply port 42 is formed and the surface of the automobile body W1 in the furnace shell 17 is set to be 300 mm or less. Of course, such a second hot air supply port 42 may be similarly arranged in the drying area A1 in the first stage but may be omitted to prevent the occurrence of quality abnormalities due to excessive heating of the external parts on the upper part of the body as an example of the present embodiment.

In addition, as shown in FIGS. 1 and 2, in a plurality of drying areas A1 to A4, a pair of right and left suction ducts 24 are provided at the position lower than the first hot air supply port 41 and the second hot air supply 42 in the furnace shell 17, specifically at the position facing the subspace S2 below the automobile body W1. These suction ducts 24 include a plurality of exhaust ports 43 arranged along the longitudinal direction of the furnace. In other words, the exhaust port 43 is arranged in a narrow space directly below the automobile body W1 to discharge the hot air sideways from both sides of the narrow space.

Figure 3:
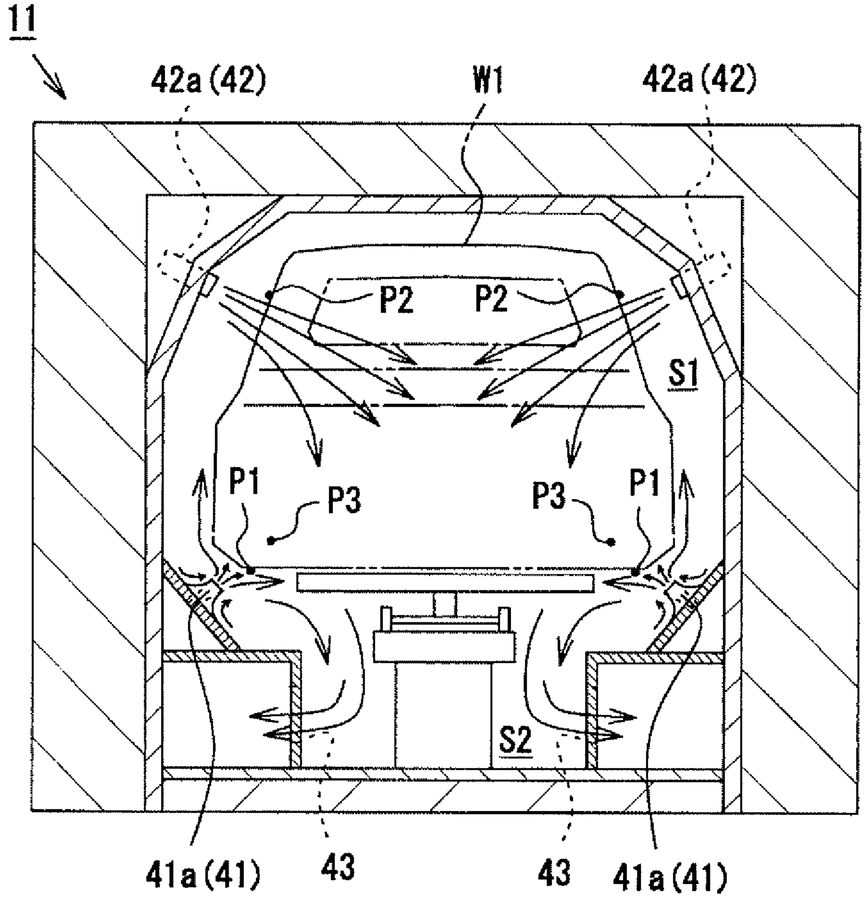
FIG. 3 is a schematic cross-sectional view explaining the flow of hot air in the drying furnace as an embodiment of the present invention.

FIG. 3 is a schematic cross-sectional view explaining the flow of hot air in the drying furnace 11 (see the arrow in the same figure). The first nozzle 41*a* constituting the first hot air supply port 41 discharges hot air diagonally upward targeting the outer floor side P1 of the automobile body W1. As a result, hot air is blown mainly to the external parts including the outer floor side P1 of the automobile body W1, and the coating film of the external parts is dried and cured. On the other hand, the second nozzle 42*a* constituting the second hot air supply port 42 discharges hot air diagonally downward targeting a window P2 of the automobile body W1 and a further inner floor side P3 (more specifically, the inner side having a locker portion). As a result, the hot air is introduced into the room through the window P2 of the automobile body W1, and the hot air is blown mainly to the internal parts including the inner floor side P3 so that the coating film of the internal parts is dried and cured. Then, the hot air supplied to the main space S1 of the furnace shell 17 flows into the subspace S2 located on the lower side and is discharged to the outside of the furnace shell 17 through the exhaust port 43.

As shown in FIG. 1, the entrance passage 12*a* in the drying furnace 11 has an air supply system 61 with the same configuration as the first hot air supply port 41. Heated air in the horizontal conveying passage 12*b* is partially returned and supplied to the air supply system 61 through the return air supply passage 62. As a result, the automobile body W1 is heated in advance at the entrance passage 12*a*. In addition, a return air supply passage 63 is provided at the exit passage 12*c* so that the air therein is partially returned to the inside of the horizontal conveying passage 12*b* and heated.

Here, the ratio (quantitative ratio) of the air supplied from the second hot air supply port 42 to the air supplied from the first hot air supply port 41 is not particularly limited and can be set arbitrarily. However, it is preferable to be set, for example, in the range of 3:7 to 5:5. In other words, the ratio of the air supplied from the second hot air supply port 42 is preferably set to the same or less than the ratio of the air supplied from the first hot air supply port 41. Within this range, it is easy to achieve shortening of temperature rising time between external parts and internal parts, and reduction of the difference in temperature rising time (see the graph of FIG. 5).

Figure 4:
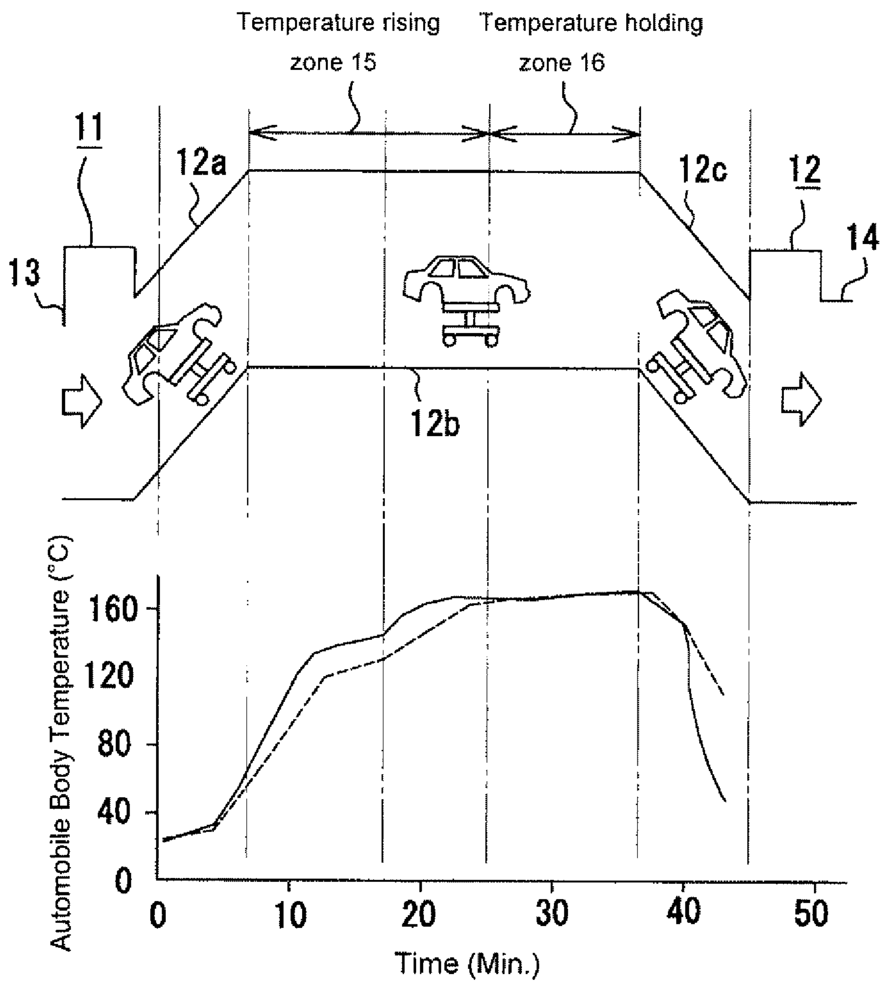
FIG. 4 is a graph showing changes in the temperature of the automobile body while being conveyed in the drying furnace as an embodiment of the present invention.
Figure 5:
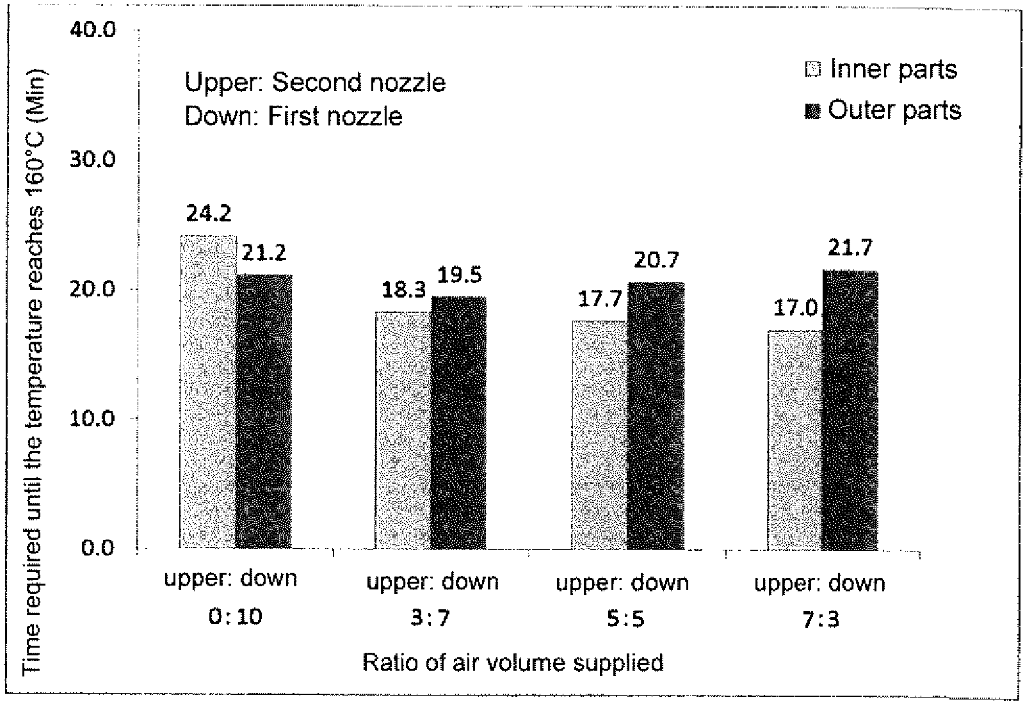
FIG. 5 is a graph showing the relationship between the ratio of air volume supplied and the time required to raise the temperature up to 160° C.
Figure 6:
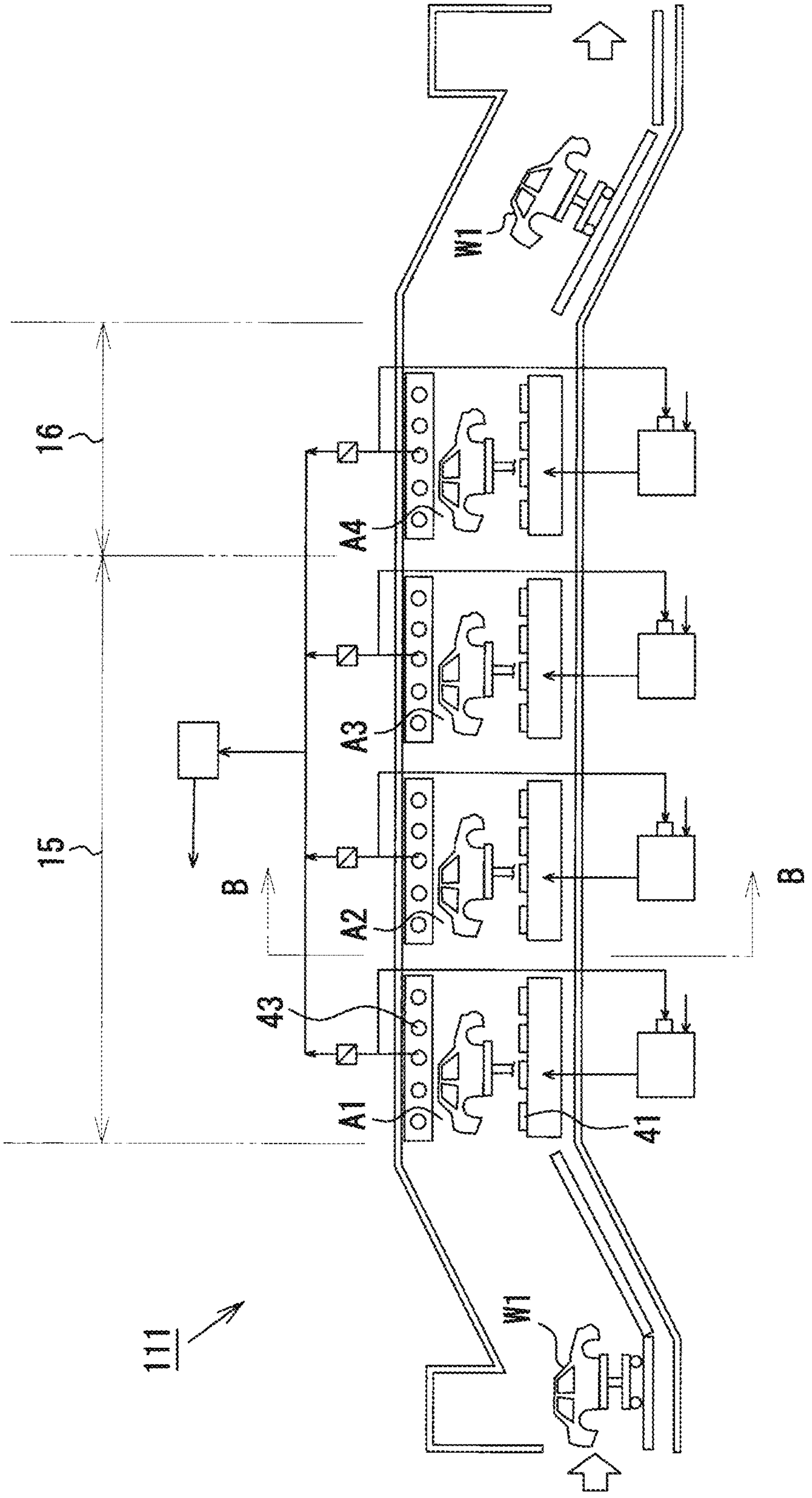
FIG. 6 is a schematic vertical sectional view showing a conventional drying furnace.
Figure 7:
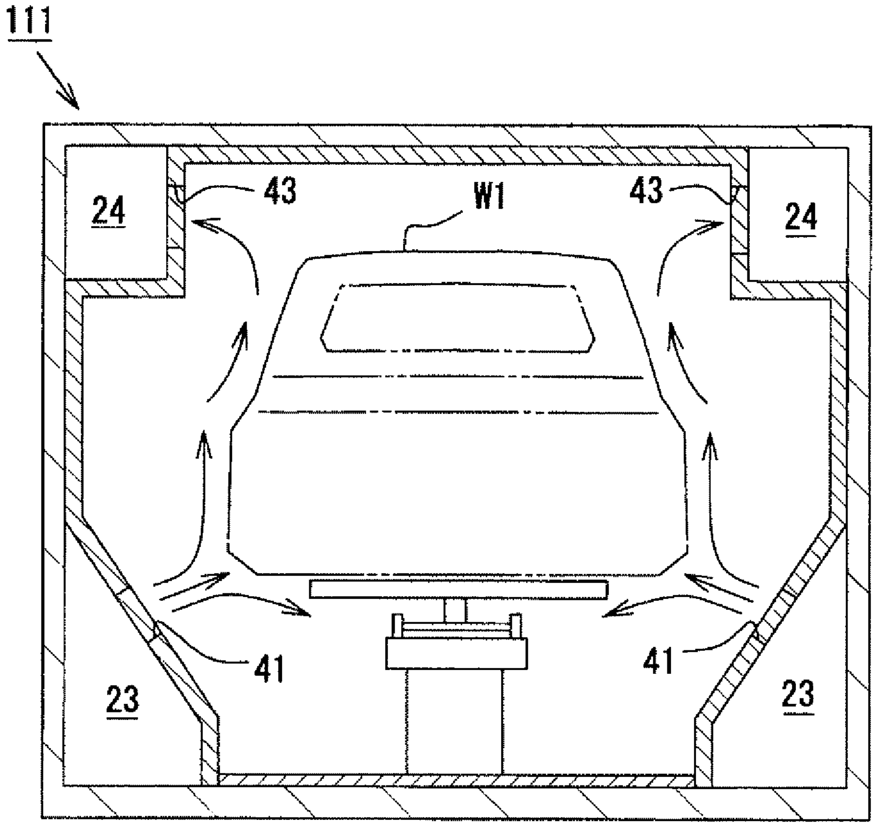
FIG. 7 is a schematic cross-sectional view taken along line B-B of FIG. 6.
Figure 8:
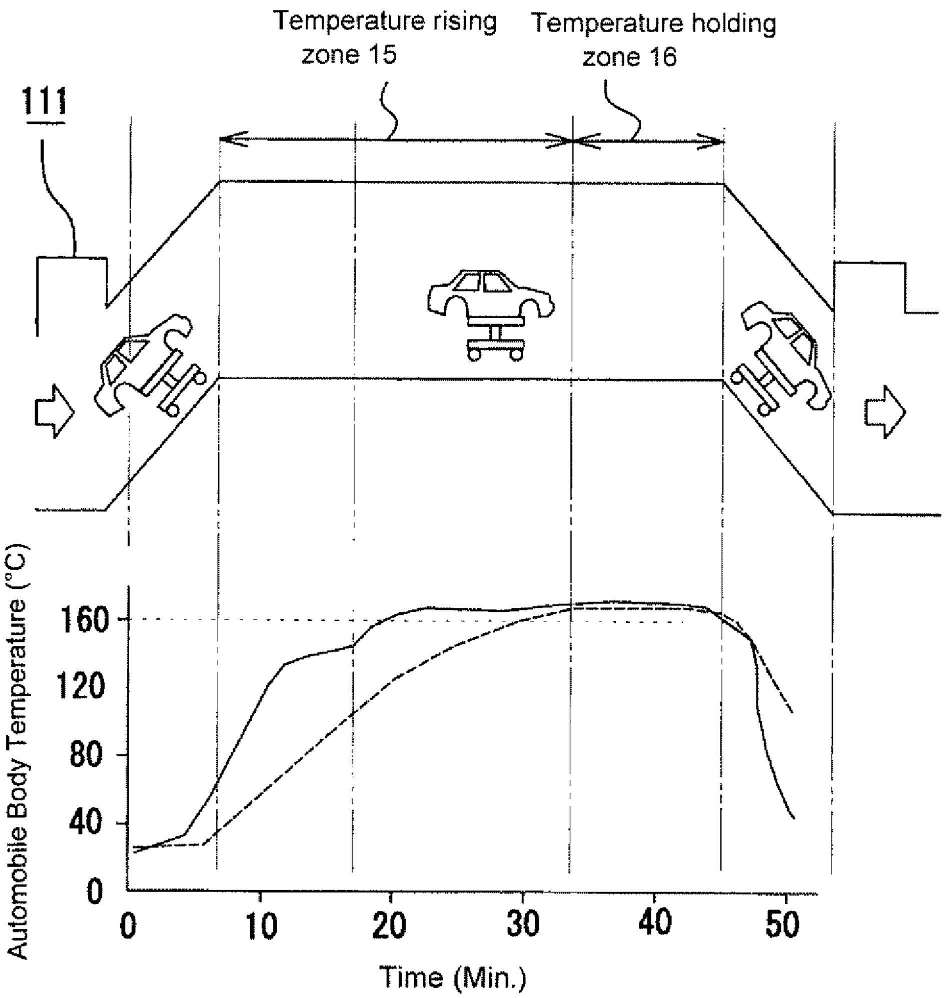
FIG. 8 is a graph showing changes in the temperature of the automobile body while being conveyed in the conventional drying furnace.

Next, a method for drying the automobile body W1 by the hot air using the drying furnace 11 of the present embodiment will be described. The graph of FIG. 4 shows the temperature transition of the automobile body W1 while being conveyed in the drying furnace 11.

The automobile body W1 which is an object to be dried is sequentially carried into the furnace body 12 from an entrance 13 by a conveying means at a constant speed. According to the present embodiment, the automobile body W1 is carried in with the door slightly open and passes through and carried out from the drying furnace 11 with the door still slightly open. The automobile body W1 is preheated while passing through the entrance passage 12*a*. At this time, the temperature of the external parts and the internal parts of the automobile body W1 rises from around 50° C. to 60° C. (see FIG. 4).

The automobile body W1 that has reached the frontmost drying area A1 in the temperature rising zone 15 is exposed to the hot air discharged from the first nozzle 41*a* of the first hot air supply port 41. At this time, the outer floor side P1 of the automobile body W1 having a large heat capacity is first heated, then the temperature rises. Next, the automobile body W1 that has reached the drying areas A2 and A3 is exposed to the hot air discharged from the first nozzle 41*a* of the first hot air supply port 41 as well as to the hot air discharged from the nozzle 42*a* of the second hot air supply port 42. As a result, not only the main external parts including the outer floor side P1 but also the main inner parts including the inner floor side P3 are heated, then the temperature rises. At this time, both the external parts and the internal parts of the automobile body W1 are heated up to the preset temperature of about 160° C. (see FIG. 4).

Similarly, the automobile body W1 that has reached the drying area A4 in the temperature holding zone 16 is also exposed to the hot air discharged from the first nozzle 41*a* of the first hot air supply port 41 together with the hot air discharged from the second nozzle 42*a* of the second hot air supply port 42. As a result, the coating film is completely dried and cured while the preset temperature of 160° C. is maintained. After that, the automobile body W1 passes through the exit passage 12*c* and then is carried out of the furnace from the exit 14.

Therefore, according to the present embodiment, the following effects can be obtained.

(1) The drying furnace 11 of the present embodiment is characterized in that the first hot air supply port 41, the second hot air supply port 42, and the exhaust port 43 are arranged at different height positions, as described above, in the plurality of drying areas A1 to A4, respectively. Therefore, when discharging hot air diagonally upward from the first hot air supply port 41 arranged at the lower position of the automobile body W1, the hot air mainly hits the external parts, and the coating film of the external parts is efficiently heated. Further, by discharging hot air diagonally downward from the second hot air supply port 42 arranged at a position higher than the first hot air supply port 41, while the hot air is being discharged from the exhaust port 43 arranged at a position lower than the first hot air supply port 41 and the second hot air supply port 42, the hot air is easily introduced into the room through the window P2 of the automobile body W1. As a result, the hot air from the second hot air supply port 42 mainly hits the internal parts, and the coating film of the internal parts is efficiently heated. Therefore, the heating-up time of the external part and the internal part is shortened, and at the same time, the difference in the heating-up time is reduced. As a result, the temperature of the external parts and the internal parts can be raised efficiently and uniformly, thus making it possible to shorten the length of the furnace. Moreover, according to the present embodiment, heating-up time is shortened, thus making it possible to shorten the length of the temperature rising zone 15 by about 10 m to 20 m.

(2) According to the drying furnace 11 of the present embodiment, hot air is discharged diagonally upward from the first hot air supply port 41 arranged at the position of the floor-back level L1 of the automobile body W1 so that the coating film of mainly external parts including the outer floor side P1 of the automobile body W1 is efficiently heated, then the temperature rises. Further, hot air is discharged diagonally downward from the second hot air supply port 42 arranged at the position of the window level L2 of the automobile body W1 so that the hot air can be introduced into the room through the window P2 of the automobile body W1. Therefore, the coating film of mainly the internal parts including the inner floor side P3 of the automobile body W1 is efficiently heated, then the temperature rises. Since the exhaust port 43 is arranged at a position lower than the floor-back level L1 of the automobile body W1, high-temperature air does not stay in the upper part of the furnace shell 17. Therefore, it is possible to prevent the quality abnormality of the coating film caused by excessive heating of the upper part of the automobile body W1.

(3) According to the drying furnace 11 of the present embodiment, the first nozzle 41*a* constituting the first hot air supply port 41 is more excellent than the second nozzle 42*a* constituting the second hot air supply port 42 in terms of attracting action to entrain the surrounding air in the furnace shell 17. Thus, using the first nozzle 41*a* makes it possible to apply a large amount of hot air to the external floor side P1 of the automobile body W1. Therefore, the coating film of mainly the external parts including the eternal floor side P1 of the automobile body W1 is heated more efficiently, thus the temperature rises in a shorter time. On the other hand, the second nozzle 42*a* constituting the second hot air supply port 42 is more excellent than the first nozzle 41*a* constituting the first hot air supply port 41 in terms of the action of allowing the hot air to advance straightly. Thus, the hot air can be properly introduced to the room through the window P2 of the automobile body W1, and the hot air can also reach the inner floor side P3 of the automobile body W1 at a relatively distant position and heat it. Therefore, the coating film of mainly the internal parts including the inner floor side P3 of the automobile body W1 is heated more efficiently, then the temperature rises in a shorter time.

(4) According to the drying furnace 11 of the present embodiment, the second nozzle 42*a* constituting the second hot air supply port 42 is made such that more than half of the total length is embedded in the furnace shell 17, and that the distance between the portion where the second hot air supply port 42 is formed and the automobile body W1 in the furnace shell 17 is set to be 300 mm or less. With such a configuration, the protrusion of the second nozzle from the furnace shell 17 can be reduced without impairing the straight-advancing action of the hot air from the second nozzle 42*a* constituting the second hot air supply port. For this reason, the portion where the second hot air supply port is formed in the furnace shell 17 can also be brought close to the automobile body W1, so as to heat the automobile body W1 more efficiently, thus making it possible to raise the temperature in a shorter time. In this embodiment, the distance between the automobile body W1 and any portions other than the portion where the second hot air supply port 42 is formed, is set to be 300 mm or less. As such, the extra space in the furnace shell 17 can be reduced, and the furnace can be totally downsized, thus eventually making it possible to reduce the facility cost and initial cost. Also, downsizing the entire furnace makes it possible to reduce the total air supply volume, the fuel cost, and the running cost. In addition, such a downsizing of the entire furnace makes it possible to reduce the total exhaust air volume, which eventually leads to the reduction of carbon dioxide emissions.

(5) The drying furnace 11 of the present embodiment has a structure of a mound-shaped furnace such that a part of the heated air in the horizontal conveying passage 12*b* is returned to the entrance passage 12*a* by the air supply system 61 and by air supply passage 62, thus reheating the air. Therefore, the heat in the furnace can be efficiently used, thus making it possible to reduce the fuel cost.

(6) According to the drying furnace 11 of the present embodiment, the second hot air supply port 42 is arranged at the position of the window level L2 of the automobile body W1, and the second nozzle 42*a* is arranged so as to face diagonally downward. Thus, even when the door is slightly opened, hot air can be properly introduced into the room through the window P2 of the automobile body W1. Therefore, it is unnecessary to open/close the door in the furnace by using e.g., a door opening/closing mechanism (see e.g., JP-A-2005-138037), nor necessary to change the flow direction of the hot air by using a deflector (see e.g., JP-A-2016-125783). This not only contributes to the reduction of equipment costs but also contributes to the downsizing of the entire furnace.

The embodiment of the present invention may also be modified as follows.

According to the above embodiment, the temperature rising zone 15 is composed of three drying areas A1, A2, and A3, and the temperature holding zone 16 is composed of one drying area A4, but the present invention is not limited to this. For example, the temperature rising zone 15 may be composed of two drying areas or four drying areas or more. Also, the temperature holding zone 16 may be composed of two or more drying areas.

According to the above embodiment, the drying furnace 11 of the present invention is embodied as a mound-shaped furnace, but it may be embodied, for example, as a flat-type furnace.

According to the above embodiment, the automobile body W1 is the object to be dried, but of course, other vehicle bodies (e.g., a train car body or the like) may also be the object to be dried.

According to the above embodiment, the drying furnace 11 of the present invention is embodied as an electrodeposition drying furnace for drying and curing an electrodeposited coating film, but it may also be embodied as a sealer furnace for drying and curing a coating film after under-coating. Yet it may be embodied as a coating drying furnace for drying and curing the coating film after intermediate-coating, under-coating, and top-coating.

According to the above embodiment, the first hot air supply port 41 and the second hot air supply port 42 are arranged in only a single furnace structure in the height direction, but they may also be arranged in plural furnace structures in the height direction.

According to the above embodiment, the nozzle is used as the first hot air supply port 41 and the second hot air supply port 42, but a slit can also be used.

According to the above embodiment, the first nozzle 41*a* and the second nozzle 42*a* are symmetrically arranged with respect to the longitudinal direction of the furnace, but they may be arranged asymmetrically.

The first nozzle 41*a* and the second nozzle 42*a* may be arranged at a predetermined angle in a predetermined direction to make a rotational flow in the furnace. Yet they may also be arranged at a predetermined angle in a predetermined direction to create a countercurrent flow.

According to the above embodiment, the automobile body W1 which is the object to be dried is continuously conveyed at a constant speed, but the present invention is not limited to this, and cycle conveyance may be applied. Further, in the case of using such a conveyance, the first nozzle 41*a* may be arranged so as to face the outer floor side P1 or the like of the automobile body W1 which requires a longer temperature rising time.

According to the above embodiment, the air supply/exhaust positions (first hot air supply port 41, second hot air supply port 42, and exhaust port 43) are continuously and regularly provided in the longitudinal direction of the furnace, but the air supply/exhaust positions may not be selectively provided on some sections.

Besides the technical ideas of the present invention, as described above, other technical ideas to be understood are described hereinafter.

(1) According to any one of the above aspects 1 to 6, the inside of the furnace is divided into a temperature rising zone and the subsequent temperature holding zone, and the two or more drying areas are arranged in the temperature rising zone, and one or more drying areas are arranged in the temperature holding zone.

(2) According to any one of the above aspects 1 to 6, the ratio of the amount of air supplied from the second hot air supply port to the amount of air supplied from the first hot air supply port (air volume ratio) is to be set within the range of 3:7 to 5:5.

(3) According to any one of the above aspects 1 to 6, the exhaust port is arranged in a narrow space located directly under the vehicle body.

DESCRIPTION OF THE REFERENCE NUMERALS

1: Drying furnace
17: Furnace shell
41: First hot air supply port
41*a*: First nozzle
42: Second hot air supply port
42*a*: Second nozzle
42: Exhaust port
A1 to A4: Drying area
L1: Floor-back level
L2: Window level
W1: Automobile body as the vehicle body

The invention claimed is:

1. A drying furnace in which a plurality of drying areas is continuously provided along a longitudinal direction of the drying furnace, to blow hot air to a vehicle body while being conveyed in the longitudinal direction within a furnace shell, and then to dry a coating film applied to the vehicle body, characterized in that the plurality of drying areas comprises:

a first hot air supply port arranged at a position below the vehicle body in the furnace shell to discharge hot air diagonally upward;

a second hot air supply port arranged at a position higher than the first hot air supply port in the furnace shell to discharge hot air diagonally downward; and an exhaust port arranged at a position lower than the first hot air supply port and the second hot air supply port in the furnace shell to discharge hot air to an outside of the furnace shell characterized in that the first hot air supply port is arranged at a position of a floor-back level of the vehicle body, and the second hot air supply port is arranged at a window level position of the vehicle body.

2. A drying furnace in which a plurality of drying areas is continuously provided along a longitudinal direction of the drying furnace, to blow hot air to a vehicle body while being conveyed in the longitudinal direction within a furnace shell, and then to dry a coating film applied to the vehicle body, characterized in that the plurality of drying areas comprises:

a first hot air supply port arranged at a position below the vehicle body in the furnace shell to discharge hot air diagonally upward;

a second hot air supply port arranged at a position higher than the first hot air supply port in the furnace shell to discharge hot air diagonally downward; and an exhaust port arranged at a position lower than the first hot air supply port and the second hot air supply port in the furnace shell to discharge hot air to an outside of the furnace shell characterized in that the first hot air supply port and the second hot air supply port are both configured to include a nozzle, wherein the first nozzle constituting the first hot air supply port has a suction effect that entrains surrounding air in the furnace shell.

3. A drying furnace in which a plurality of drying areas is continuously provided along a longitudinal direction of the drying furnace, to blow hot air to a vehicle body while being conveyed in the longitudinal direction within a furnace shell, and then to dry a coating film applied to the vehicle body, characterized in that the plurality of drying areas comprises:

a first hot air supply port arranged at a position below the vehicle body in the furnace shell to discharge hot air diagonally upward;

a second hot air supply port arranged at a position higher than the first hot air supply port in the furnace shell to discharge hot air diagonally downward; and an exhaust port arranged at a position lower than the first hot air supply port and the second hot air supply port in the furnace shell to discharge hot air to an outside of the furnace shell characterized in that the first hot air supply port and the second hot air supply port are both configured to include a nozzle, wherein the second nozzle constituting the second hot air supply port has an effect of allowing hot air to advance straightly.

4. The drying furnace according to claim 1, characterized in that the first hot air supply port and the second hot air supply port are both configured to include a nozzle, wherein the first nozzle constituting the first hot air supply port has a suction effect that entrains surrounding air in the furnace shell.

5. The drying furnace according to claim 1, characterized in that the first hot air supply port and the second hot air supply port are both configured to include a nozzle, wherein the second nozzle constituting the second hot air supply port has an effect of allowing hot air to advance straightly.

6. The drying furnace according to claim 2, characterized in that the first hot air supply port and the second hot air supply port are both configured to include a nozzle, wherein the second nozzle constituting the second hot air supply port has an effect of allowing hot air to advance straightly.

7. A drying furnace in which a plurality of drying areas is continuously provided along a longitudinal direction of the drying furnace, to blow hot air to a vehicle body while being conveyed in the longitudinal direction within a furnace shell, and then to dry a coating film applied to the vehicle body, characterized in that the plurality of drying areas comprises:

a first hot air supply port arranged at a position below the vehicle body in the furnace shell to discharge hot air diagonally upward;

a second hot air supply port arranged at a position higher than the first hot air supply port in the furnace shell to discharge hot air diagonally downward; and an exhaust port arranged at a position lower than the first hot air supply port and the second hot air supply port in the furnace shell to discharge hot air to an outside of the furnace shell;

wherein the first hot air supply port is arranged at a position of a floor-back level of the vehicle body, and the second hot air supply port is arranged at a window level position of the vehicle body;

wherein the first hot air supply port and the second hot air supply port are both configured to include a nozzle, wherein a first nozzle constituting the first hot air supply port has a suction effect that entrains surrounding air in the furnace shell and a second nozzle constituting the second hot air supply port has an effect of allowing hot air to advance straightly, wherein the first nozzle is configured so that hot air is discharged diagonally upward from the first hot air supply port so as to dry the coating film of mainly external parts including an outer floor side of the vehicle body; and wherein the second nozzle is configured so that hot air is discharged diagonally downward from the second hot air supply port, wherein hot air discharged by the second nozzle is introduced into a room through a window of the vehicle body, so as to dry the coating film of mainly internal parts including an inner floor portion of the vehicle body.

8. The drying furnace according to claim 4, characterized in that the first hot air supply port and the second hot air supply port are both configured to include a nozzle, wherein the second nozzle constituting the second hot air supply port has an effect of allowing hot air to advance straightly.

* * * * *